United States Patent
May (10) Patent No.: US 7,890,760 B2
(45) Date of Patent: Feb. 15, 2011

(54) SECURE METHOD OF TERMINATION OF SERVICE NOTIFICATION

(75) Inventor: Darrell May, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/858,603

(22) Filed: Aug. 18, 2010

(65) Prior Publication Data

US 2010/0313022 A1    Dec. 9, 2010

Related U.S. Application Data (63) Continuation of application No. 11/352,323, filed on Feb. 13, 2006, now Pat. No. 7,802,097.

(51) Int. Cl.
*H04L 9/32* (2006.01)
(52) U.S. Cl. .................. 713/171; 455/411; 713/193
(58) Field of Classification Search .................. None
See application file for complete search history.

(56) References Cited

U.S. PATENT DOCUMENTS

| | | |
|---|---|---|
| 5,513,245 A | 4/1996 | Mizikovsky et al. |
| 5,675,647 A | 10/1997 | Garneau et al. |
| 5,887,250 A | 3/1999 | Shah |
| 2002/0165783 A1 | 11/2002 | Gonthier et al. |
| 2002/0174335 A1 | 11/2002 | Zhang et al. |
| 2003/0003895 A1 | 1/2003 | Wallentin et al. |

FOREIGN PATENT DOCUMENTS

WO    WO9949419    9/1999

*Primary Examiner*—Pierre M Vital
*Assistant Examiner*—Christopher J Raab
(74) *Attorney, Agent, or Firm*—Ridout & Maybee LLP (57) ABSTRACT

A method for notifying a client device of termination of at least one service provided to the client device by a server system within an enterprise network is disclosed. The method includes the step of establishing authentication data and notification data, where the authentication data is related to the notification data, and sending the authentication data to the client device for storage during a provisioning operation. When the server system identifies a termination of service, it sends the notification data to the client device, which may then authenticate the received notification data using the authentication data.

9 Claims, 3 Drawing Sheets

SECURE METHOD OF TERMINATION OF SERVICE NOTIFICATION

CROSS-REFERENCE TO RELATED APPLICATIONS

The present application is a continuation of U.S. patent application Ser. No. 11/352,323, filed Feb. 13, 2006, and owned in common herewith.

FIELD

The present application relates to methods for providing notification that there has been termination of one or more services and, in particular, to methods for such notification where the one or more terminated services were provided by one or more server entities within an enterprise network.

BACKGROUND

Presently there exist many different types of services that can be provided to client devices over some form of shared network infrastructure. For example, a server system may provide a message forwarding service, whereby messages, such as e-mail, are "pushed" to the client device over the shared network infrastructure. If a server providing one of these services needs to notify a client device that the service has been terminated, one way in which it might provide such notification would be through the use of one or more termination of service (ToS) packets. A potential problem with such ToS packets, particularly in the situation where ToS packets are sent over a non-encrypted channel, is the possible risk that someone might spoof such packets for the purposes of carrying out denial of service (DoS) type attacks.

Accordingly, it would be advantageous to improve methods for providing ToS notification.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a method for notifying a wireless client device of termination of at least one service provided to the client device by a server system through a wireless network, the server system being disposed within an enterprise network having access to the wireless network, the server system having stored thereon notification data and the wireless client device having stored thereon authentication data, wherein the authentication data is related to the notification data, and wherein the server system stores an encryption key associated with the wireless client device for encrypted communications for said at least one service.

The method includes determining, at the server system, that the encryption key is expired and that no other unexpired encryption keys are presently available in association with the wireless client device; ceasing to provide the at least one service to the wireless client device; and, in response to determining that the encryption key is expired, transmitting said notification data to the wireless client device to notify the wireless client device that the at least one service has been terminated. The client device may authenticate said notification data received from the server system on the basis of the stored authentication data and the relationship between the notification data and the authentication data.

In a further aspect, the present application describes a system and/or a non-transitory computer-readable medium storing executable instructions for implementing the methods described herein.

In another aspect, the present application provides a method for notifying a wireless client device of termination of at least one service provided to the client device by a server system through a wireless network. The server system is disposed within an enterprise network having access to the wireless network. The method includes the steps of, during a provisioning operation, establishing authentication data and notification data, sending the authentication data to the client device for storage in non-volatile memory within the client device, and storing the notification data at the server system, wherein the notification data is related to the authentication data. It also includes steps of establishing the service provided to the client device by the server system, identifying termination of the service provided to the client device by the server system, and transmitting the notification data to the client device when the termination of the service is identified. The client device may authenticate the notification data received from the sever system on the basis of the stored authentication data and the relationship between the notification data and the authentication data.

In another aspect, the present application provides a system including at least one client device, including non-volatile memory storing authentication data, and an enterprise network including a server system in communication with the client device through a wireless network to provide at least one service to the client device. The server system includes a termination of service (ToS) notifier for identifying termination of the service and a provisioning component within the server system for establishing the authentication data and notification data, sending the authentication data to the client device, and storing the notification data within the server system. The ToS notifier transmits the notification data to the client device if the ToS notifier identifies that the service has been terminated. The notification data is related to the authentication data and the client device includes an authentication component for authenticating the received notification data on the basis of the stored authentication data and the relationship between the notification data and the authentication data.

Embodiments of the present application are not limited to any particular operating system, mobile device architecture, server architecture, or computer programming language.

The present application makes reference to "services" being provided from an enterprise network server system to a wireless client device through a wireless network. References to "services" will be understood to include application-level service, such as, for example, message forwarding or content "push" services. It will be appreciated that references to the "services" provided by the enterprise network-based server system are not intended to include the connection-level services provided by the wireless network operator, such as establishment of a wireless communication channel and related radio network controller services.

Figure 1:
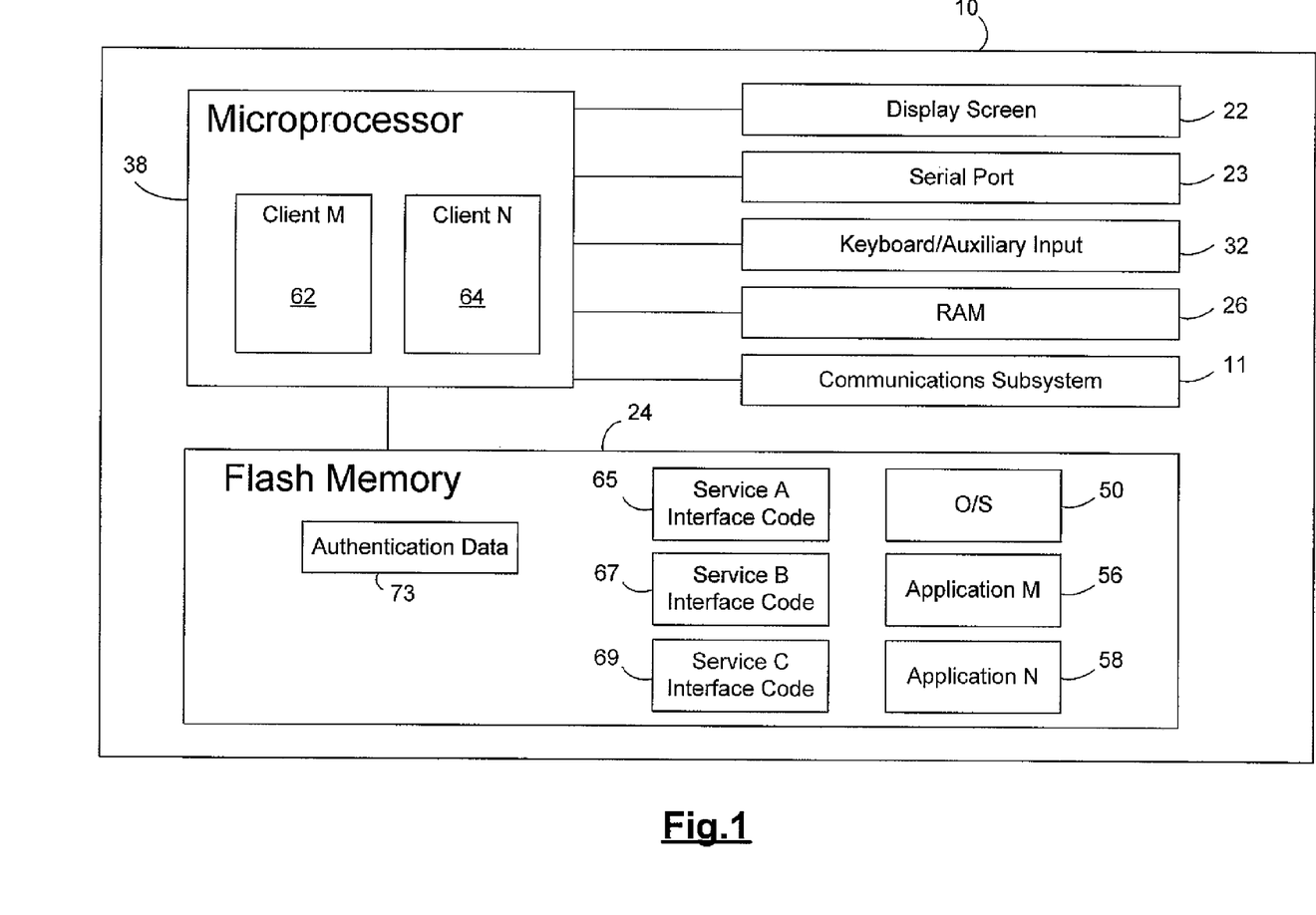
FIG. 1 shows a block diagram of an electronic communications device to which embodiments of the present invention can be applied.

Referring now to the drawings, FIG. 1 is a block diagram of an example embodiment of a client device 10. In at least some examples, the client device 10 is a two-way, electronic communications device having data and possibly also voice communication capabilities. In at least one example embodiment, the client device 10 has the capability to exchange messages with other devices and computer systems on the Internet. Depending on the functionality provided by the client device 10, in various embodiments the client device may be a multiple-mode communication device configured for both data and voice communications, a smartphone, a PDA enabled for wireless communication, or a mobile computer system enabled for wireless communication, among other things.

In the illustrated embodiment, the client device 10 includes a wireless communications subsystem 11 for exchanging communications with one or more communications networks including, for example, cellular-type wireless wide area networks and/or wireless local area networks. The client device 10 includes a microprocessor 38 that controls the overall operation of the device. The microprocessor 38 interacts with the communications subsystem 11 and also interacts with further device subsystems such as a display 22, a serial port 23, flash memory 24, random access memory (RAM) 26, and user input devices 32 such as a keyboard or keypad and auxiliary on-screen navigation and selection input devices such as a touch screen, touch pad or thumbwheel. In some embodiments, the client device 10 can include one or more subsystems for communication with a network or device over a fixed link. The serial port 23 is one example of such a subsystem.

Operating system software 50 and various software applications (for example, application M 56 and application N 58) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the application M 56 and the application N 58) on the client device 10. A predetermined set of software applications which control basic device operations, including data and voice communication applications for example, will normally be installed on the client device 10. In some embodiments, the processor 38 is configured to implement one or more clients for interacting with the various device subsystems described above (or other device subsystems) to carry out various communications-related functions and tasks (for example, document exchanges, e-mail, various types of user information updates). For example, under instructions from the applications 56 and 58 resident on the client device 10, the processor 38 could be configured to implement clients 62 and 64 respectively.

Service interface code (for example, service A interface code 65, service B interface code 67 and service C interface code 69) is stored in a number of blocks of the flash memory 24. In some example embodiments, at least some portion of this service interface code is stored in the RAM 26 rather than the flash memory 24. The service interface code provides information to the clients running on the processor 38 (for example, the clients 62 and 64) about services provided through a server system located some distance from the client device 10. With this information, the clients are able to cooperate with the services to carry out communications-related functions and tasks. In one embodiment, the service interface code may include data identifying an association or registration with a particular enterprise network and/or enterprise network server system for receiving the services. The information provided by the service interface code is understood by those skilled in the art, and will vary depending upon factors such as the particular client and the service, for example. Delivery information, authentication information and access information are just some examples of possible information provided by the service interface code. It will be understood that a particular client running on the processor 38 could rely upon more than one service. Such clients could occasionally access certain service interface code associated with one service, and then on other occasions access other service interface code associated with other services. For example, the client M 62 might rely upon services A and B. Thus, at certain times the client M 62 might access the service A interface code 65, and at other times the client M 62 might access the service B interface code 67.

In some examples of the client device 10, authentication data 73 is stored in the flash memory 24. In some embodiments, the authentication data 73 is a unique secret code shared by the client device 10 and a remote server system. In another embodiment, the authentication data 73 is an authentication key. The authentication key may be shared by the server system in an embodiment employing symmetric decryption or it may be the private key in a key pair for decrypting communications from the server system in an asymmetric embodiment. For at least some example embodiments in which communications are carried out in accordance with a packet-based protocol, the authentication data 73 includes one or more ToS packets. As will be described herein, ToS packets are intended for use in notifying the client device that one or more services provided by a server system have been terminated.

In some example embodiments the authentication data 73 may be stored in a manner that reduces the risk of this data being erased in so-called device wipes, where portions of the flash memory 24 are erased (including possibly any key store regions). One skilled in the art will appreciate that there are a number of ways in which such risk reduction could be accomplished. For example, a region of the flash memory 24 could be configured or designated as non-volatile memory so as to protect that region of memory in the case of a device wipe. As another example, the authentication data 73 could be stored on some non-volatile secure memory physically separate from the flash memory 24.

It will be understood that, in some examples, one or more of the authentication data 73 and the service interface code 65, 67 and 69 can be stored on other types of memory besides the flash memory 24. As an example, a selected one or more of the authentication data 73 and the service interface code 65, 67 and 69 could be stored on memory within a smart card that is typically removably installed within at least some examples of the client device 10. As will be appreciated by those skilled in the art, the smart card is used to identify a subscriber of the client device 10 and to personalize the client device 10, among other things. The smart card can be used to enable various communications-related functionality including functionality relating to one or more of the following: web browsing and messaging such as e-mail, voice mail, short message service (SMS), and multimedia messaging services (MMS). More advanced functionality could include one or more of the following: point of sale, field surveys and sales force automation. In some examples, the smart card stores additional subscriber information for the client device 10, including date book (or calendar) information and recent call information.

Figure 2:
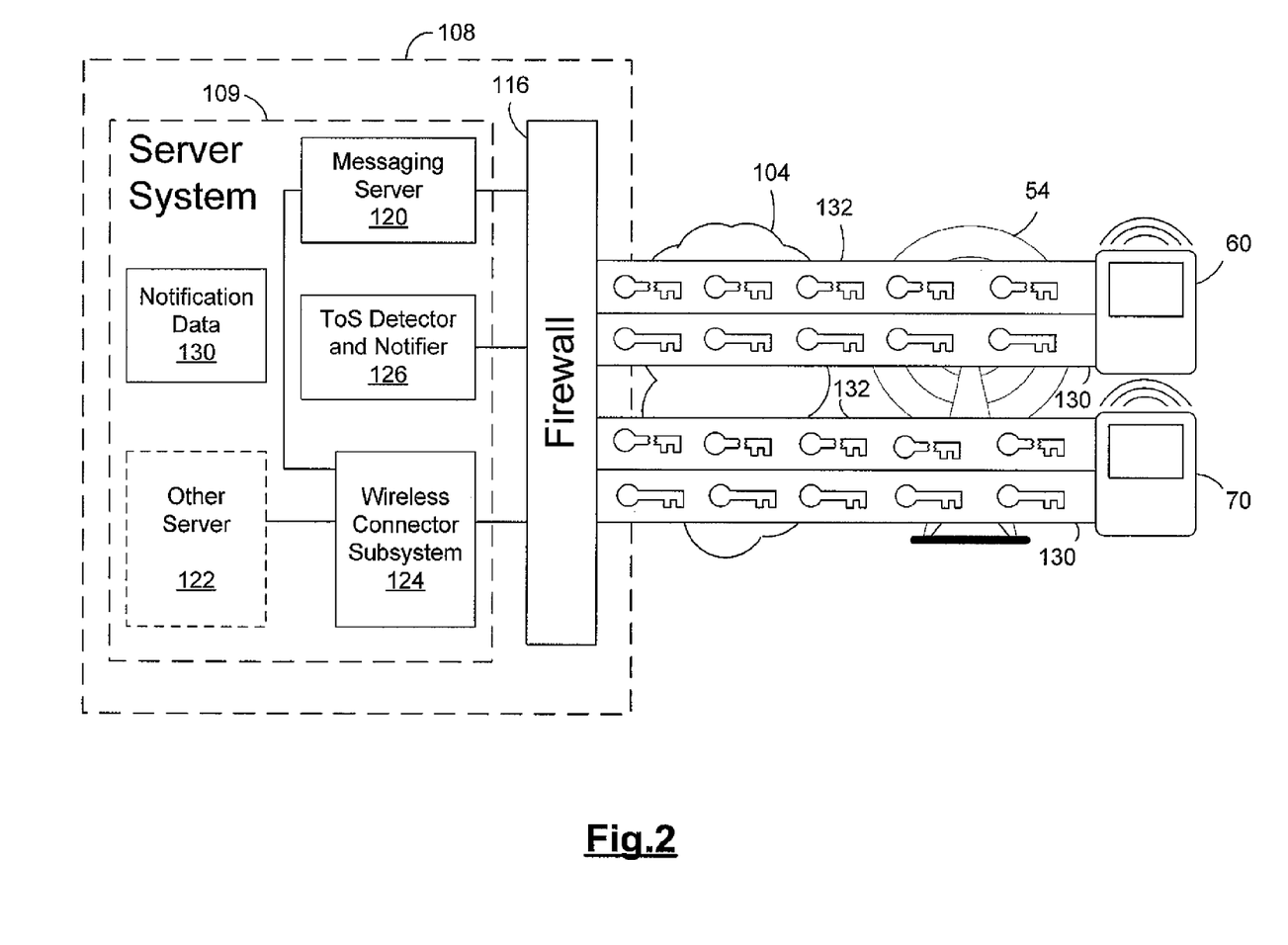
FIG. 2 shows a block diagram of an example architecture in which communications can pass to and from devices such as the communications device of FIG. 1.

FIG. 2 shows a block diagram of an example architecture within which client devices 60 and 70 can receive and send communications. In at least some example embodiments, the client devices 60 and 70 are similar to the client device 10 shown in FIG. 1. Although only two client devices 60 and 70 are shown in FIG. 2, the number of client devices that communicate within the illustrated architecture is primarily only limited by the resource limitations of the networks within which these client devices are intended to operate.

In the illustrated embodiment, the client devices 60 and 70 send and receive communications through at least one wireless mobile network 54, which in an example embodiment is a network that supports wireless packet data (by way of non-limiting example, in various embodiments, the network 54 may support at least one of Mobitex™, DataTAC™, GSM (Global System for Mobile Communication), GPRS (General Packet Radio System), EDGE (Enhanced Data rates for GSM Evolution) and/or UMTS (Universal Mobile Telecommunications Systems), WiFi and/or WiMax). In some embodiments, the client devices 60 and 70 may be enabled to exchange communications over at least two different wireless networks, for example a cellular-type GSM network and a WLAN (Wireless Local Area Network). As shown in FIG. 2, the wireless network 54 is connected through a wide area network such as Internet 104 to an enterprise network 108. In some embodiments, the wireless network 54 may have a connection to the enterprise network 108 that does not pass through the Internet 104.

In at least some example embodiments, the enterprise network 108 is a network operated by or for a corporation or organization (such a network could also be operated by or for a number of organizations or companies that have agreed to share certain IT resources). As an example, the enterprise network 108 could comprise an intranet including one or more local area networks that are located behind a firewall 116 that is employed to limit exposure of the enterprise network 108 to an attack. In some examples, a number of users are associated with the enterprise network 108 and have unique communications accounts (for example, e-mail accounts) assigned to them. In such examples, one or more services in connection with the communications accounts are provided by a server system 109 to the client devices 60 and 70, and also to client machines (not shown) that typically exist within the enterprise network 108. In some examples the server system 109 will be a single physical unit, in other examples the server system will be multiple physical units.

Within the illustrated server system 109, at least one messaging server 120, which may for example comprise Microsoft Exchange™ server, IBM Lotus Domino™ server (or other suitable e-mail server software), is connected to the firewall 116 for receiving e-mail messages from the Internet 104 and routing those messages. Messages received by the messaging server 120 may, in embodiments such as the illustrated embodiment, originate from many different possible sources. For instance, a message may have been sent by a computer (not shown) within the enterprise network 108, from a device similar to the client devices 60 and 70, or from a different computing device or other device capable of sending messages, via the Internet 104, and possibly through an application service provider (ASP) or Internet service provider (ISP), for example.

Thus, the messaging server 120 typically acts as a primary interface for the exchange of e-mail (and, in some examples, other types of messages such as SMS text messages) within the corporation/organization and over the Internet 104. In some examples, the messaging server 120 provides functions beyond message management, including the management of data associated with calendars and task lists, for instance. As will be appreciated by those skilled in the art, objects and other data received by the messaging server 120 are typically stored in a message store (not shown) for possible retrieval in the future.

In the illustrated embodiment, the server system 109 includes a wireless connector subsystem 124. As will be appreciated by those skilled in the art, the enterprise network 108 could, in some examples, include multiple wireless connector subsystems 124 such as in some implementations where a large number of client devices need to be supported. In some instances, a group of multiple wireless connector subsystems 124 will be a part of what can be referred to as a "cluster". Those wireless connector subsystems in a cluster will have access to a number of the same messaging servers, key stores and/or other server-related resources. In some examples, the wireless connector subsystem 124 relays received electronic messages from a message store within the enterprise network 108 out to the client devices 60 and 70, and conversely the wireless connector subsystem 124 can also facilitate the handling of messages composed on the client devices 60 and 70, which are sent to the messaging server 120 for subsequent delivery. It will be seen that the wireless connector subsystem 124, which is located behind firewall 116, functions as an interface between the enterprise network 108 and the wireless network 54 to provide a messaging "push" service to the client devices 60 and 70.

In at least some example embodiments, the wireless connector system 124 encrypts (and might also compress) e-mail messages that are sent out to the client devices 60 and 70 so as to ensure that the data is protected outside of the enterprise firewall 116. By way of example, the wireless connector subsystem 124 may encrypt data using Advanced Encryption Standard (AES) or Triple Data Encryption Algorithm (TDEA) encryption methods using a key unique to the target device 60 (or 70) so that data is encrypted in transit. The term "primary key" as used herein refers to this unique key stored on the target device 60 (or 70) and used by it to encrypt and decrypt AES/TDEA (or a similar standard) protected data inbound or outbound over one or more secure channels between the client device and the server system 109.

By way of another example, the cryptosystem could be asymmetric rather than symmetric. In asymmetric cryptosystems the message sender and the message receiver do not use the same key, whereas in symmetric cryptosystems the sender and receiver use the same key. Optionally, the server system 109 includes, in some examples, a wireless VPN router (not shown) which could be used in those example embodiments for which each of the client devices 60 and 70 have a dedicated IP address. Those skilled in the art will appreciate that a VPN connection through the wireless VPN router could employ either transmission control protocol (TCP) or user datagram protocol (UDP) over IP.

After it is received at the client device 60 (or 70), the data sent from the server system 109 is decrypted. As known in the art, encryption in the present context requires the pre-establishment of keys at the server system 109 and at the client devices 60 and 70 during, for example, a communications provisioning process between the client device and the server system 109. It will be understood that there are various methods for pre-establishing keys. For instance, the keys provided to the client devices 60 and 70 could be generated within the server system 109, and then transmitted to a desktop computer (not shown) for example, within the enterprise network 108, from which one or more keys (such as a primary key, for example) can be downloaded to the client device 60 (or 70) via a cradle physically connected to the desktop computer or via some other form of private or secured connection. Alternatively, for example, keys may be generated on each of the server system 109 and the client devices 60 and 70 based on the shared secrets that had previously been securely exchanged between, for example, the wireless connector subsystem 124 and the client devices 60 and 70.

In some examples, the wireless connector subsystem 124 can be used to control when, if, and how messages should be sent to the client devices 60 and 70. For instance, the wireless connector subsystem 124 might carry out any number of the following functions: monitor the user's "mailbox" (e.g. the message store associated with the user's account on the message server 120) for new e-mail messages; apply user-definable filters to new messages to determine if and how the messages will be relayed to the user's device 60 (or 70); and compress and/or encrypt new messages (as previously explained) and push them to the devices 60 and 70 via the Internet 104 and the wireless network 54.

In those systems where the wireless connector subsystem 124 encrypts data prior to transit outside of the enterprise network 108, typically other data that passes along a return path will also be encrypted (i.e. the client devices 60 and 70 will use AES or TDEA, for example, to encrypt data comprising composed messages). The wireless connector subsystem 124 can decrypt (and decompress if it was compressed) this data, and also possibly perform reformatting of the composed messages in some examples. Then the wireless connector subsystem 124 reroutes the composed messages to messaging server 120 for delivery.

In at least some examples, certain properties or restrictions associated with messages that are to be sent from and/or received by the client devices 60 and 70 can be defined (for example, by an administrator in accordance with IT policy) and enforced by the wireless connector subsystem 124. These may include whether the client devices 60 and 70 may receive encrypted and/or signed messages, minimum encryption key sizes, whether outgoing messages must be encrypted and/or signed, and whether copies of all secure messages sent from the client devices 60 and 70 are to be sent to a pre-defined copy address, for example.

In some examples, the wireless connector subsystem 124 may provide additional or other control functions, such as only pushing certain message information or pre-defined portions (e.g. "blocks") of a particular message stored on a message store associated with the messaging server 120 to the client device 60 (or 70). For example, when a message is initially retrieved from the messaging server 120, the wireless connector subsystem 124 might be adapted to push only the first part of a message to the client device, with the part being of a pre-defined size (for example, 2 KB). The user can then request more of the message, to be delivered in similar-sized blocks by the wireless connector subsystem 124 to the client device 60 (or 70), possibly up to a pre-defined maximum message size. Another possible control function of the wireless connector subsystem 124 might be pushing messages in accordance with some predefined schedule, or at some pre-defined interval, for example.

In the illustrated embodiment, each of the client devices 60 and 70 have one or more secure channels 130 for secure communications, and one or more non-secure channels 132 for non-secure communications between the client device 60 (or 70) and the server system 109. As previously explained, data sent over the secure channel 130 is encrypted (for example, encrypted using an AES method, a TDEA method, or some other method) so that any data that might have been intercepted along the channel within the Internet 104 and the wireless network 54 would be protected from being maliciously or otherwise used because the interceptor would lack the necessary key (for example, the primary key) to decrypt the intercepted data. Conversely, any data sent along the non-secure channel 132 may not be encrypted. As a result, typically at least some information could be extracted (without carrying out decryption) should any data be intercepted along the non-secure channel 132. In at least some example embodiments, the client device 60 (or 70) is configured to reject certain data that it expects to receive on the secure channel 130 rather than the non-secure channel 132. A reason for doing this might be to prevent unauthorized parties (for example, unethical marketing entities) from succeeding in producing unauthorized actions within the client device 60 (or 70).

With respect to the secure channel 130, the client devices 60 and 70, when receiving data over this channel, expect to receive encrypted rather than non-encrypted data. In at least some example embodiments, any unencrypted data received on the channel 130 is simply ignored. Also, if the key of the client device 60 (or 70) is not the correct key for the decoding the received encoded data, then so too will that encoded data be ignored.

In one example, the client device 60 (or 70) may expect a termination of service message to arrive through the secure channel 130. A termination of service message may instruct the client device 60 (or 70) to take certain actions that may seriously impair the device operation and, as such, it is a message that may be subject to a relatively high degree of trust and authentication. If the client device 60 (or 70) were configured to respond to a termination of service message from an unauthenticated source over the non-secure channel 132, it may open the client device 60 (or 70) to denial of service attacks. An unscrupulous entity could "spoof" the server system and send termination of services messages to client devices.

In a number of situations, the client device 60 (or 70) might be unaware that it is no longer able to receive data from the wireless connector subsystem 124 over the secure channel 130. For example, the client device 60 (or 70) might have a certain user's profile stored on the device, but the key (for example, the primary key) associated with that user profile might be expired. In this case, the wireless connector subsystem 124 could be unable to communicate over the secure channel 130 in order to notify that one or more services having been terminated because the wireless connector subsystem 124 might not have (or might be restricted from using) the expired key necessary to communicate with the client device 60 (or 70) over the secure channel 130. In another embodiment, the association between the client device 60 (or 70) and the wireless connector subsystem 124 and/or server system 109 may have been changed, i.e. the client device 60 (or 70) may have been moved to another server system and, possibly, another enterprise network, yet the user of the client device 60 (or 70) may have performed a restore operation that resulted in the presence of out-dated server interface code showing the out-dated association. These circumstances may arise if, for example, a user changes organizations or departments and is therefore supposed to receive services from a different server system or enterprise network. In this situation, new encryption keys may have been established for communication with the new server system. If an out-dated service interface code directs the client device to receive services or communicate with the old server system, the old server system may need a mechanism to tell the device that its service at the old server system has been terminated. In yet another example, there could be some problem with the encryption keys normally accessible to the server system 109, such problem preventing useful outgoing data from being sent by the server system 109 over the secure channel 130. Again, in such a situation the client device 60 (or 70) may depend upon termination of service (ToS) notification over some channel other than the secure channel 130, as notification over the secure channel 130 that one or more services have been terminated is prevented from being carried out. Thus, in such situations where notification of the termination of one or more services, by way of a transmission over any secure channels such as the secure channel 130 is not possible (or is impractical), it may become necessary to use a non-secure channel such as the non-secure channel 132 instead.

The concern with notification of termination of one or more services over the non-secure channel 132 is that some unauthorized party will be able to generate, without knowledge of any keys associated with the client device 60 (or 70), a ToS notification to maliciously trick the client device 60 (or 70) into registering a termination of one or more services. Accordingly, a method and mechanism for ensuring authentication of the ToS notification in the event of failure of the secure channel 130, may be desirable.

In at least some example embodiments, the client device 60 (or 70) and the server system 109 pre-establish notification data 130 and authentication data 73 which is stored on the server system 109 and the client device 60 (or 70), respectively, during the device provisioning phase. The notification data 130 and the authentication data 73 are related, such that the authentication data 73 may be used to authenticate or verify the notification data 130. When termination of service occurs, the server system 109 may send the pre-established notification data 130 to the client device 60 (or 70) over the non-secure channel 132 and the client device 60 (or 70) may authenticate the notification data 130 using the authentication data 130 stored on the device.

The provisioning operation may be carried out between the server system 109 and the client device 60 (and 70) within the security of the enterprise network over a secure private channel, and not over the public wireless network 54 infrastructure. In some embodiments, the secure private channel includes a wired connection between the client device 60 (or 70) and the server system 109, such as through a desktop computer connected via a private LAN to the server system 109. The connection between the enterprise network (e.g. the desktop computer) and the client device 60 (or 70) may be via the serial port of the client device 60 (or 70), a localised over-the-air (OTA) connection (e.g. Bluetooth™, infrared, etc.), or other such connections.

During the period for which there exists a termination of one or more services within the server system 109 but the client device 60 (or 70) has not yet received ToS notification, there may be encrypted data that the client device 60 (or 70) has sent to the server system 109. In some examples, the encrypted data received from the client device 60 (or 70) will, because the data is not decrypted, be allowed to be permanently lost. In other examples, encrypted data received from the client device 60 (or 70) during this period will instead be stored in a queue. However, if new keys are established between the client device 60 (or 70) and the server system 109, the queued data that was encrypted with the old key may be effectively lost in any event.

Figure 3:
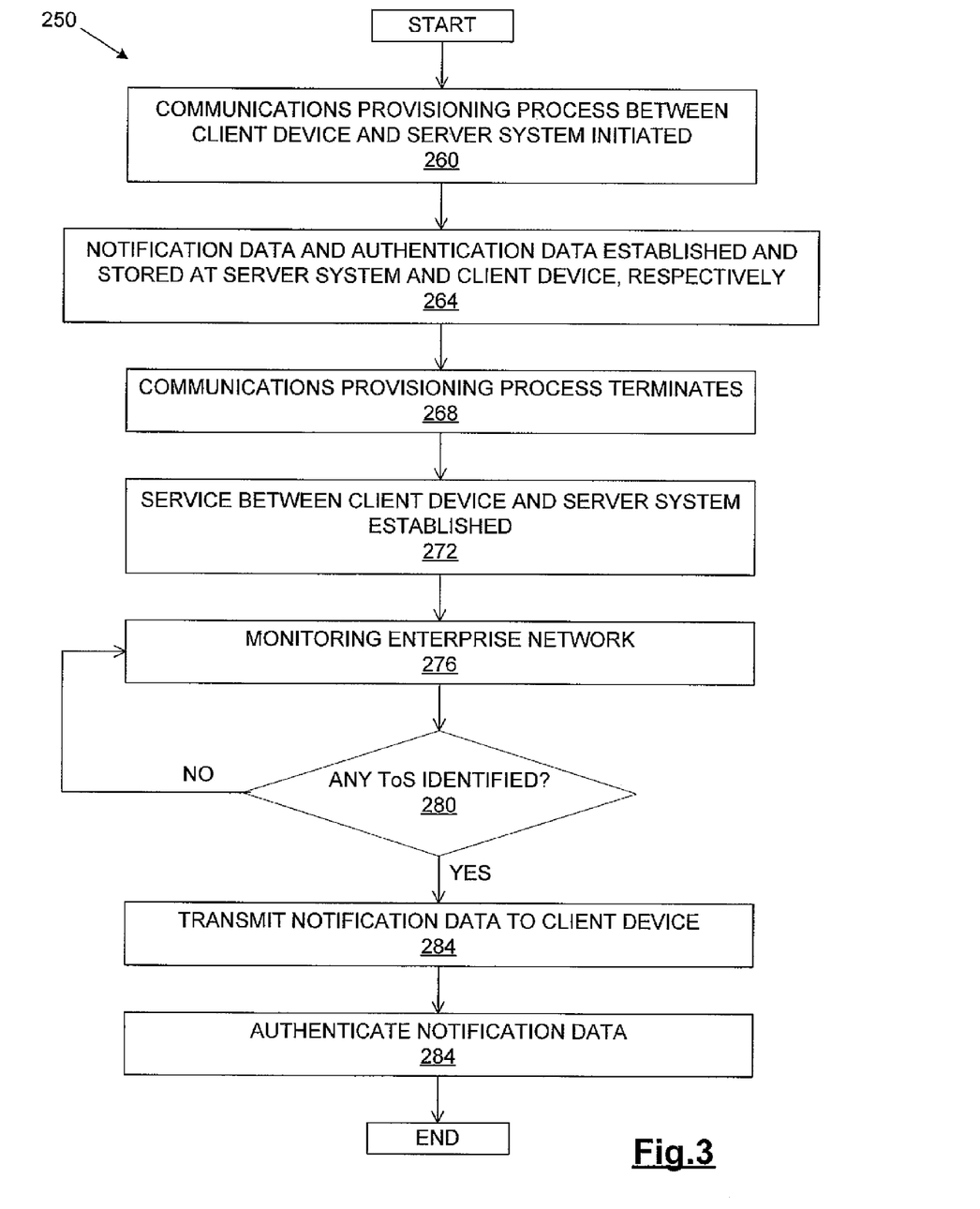
FIG. 3 shows, in flow chart form, a method for notifying a device of a termination of one or more services in accordance with example embodiments.

FIG. 3 illustrates a ToS notification method 250 in accordance with example embodiments of the invention. The method 250 can be carried out in system architectures similar to the architecture illustrated in FIG. 2, for example.

As indicated in step 260, the method 250 begins with a communications provisioning process being initiated between the client device 60 (or 70) and the server system 109. The communications provisioning process is carried out prior to the establishment of one or more services between the client device 60 (or 70) and the server system 109 in step 272 and, as will be appreciated by those skilled in the art, the communications provisioning process involves the carrying out a number of provisioning steps including the generation of one or more keys (for example, the primary key) for encryption and decryption of data over the secure channel 130. As previously described, the one or more keys provided to the client device 60 (or 70) could be generated within the server system 109, and then transmitted to a desktop computer (not shown) for example, within the enterprise network 108, from which one or more keys could be downloaded to the client device 60 (or 70) via a cradle physically connected to the desktop computer or via some other form of private or secured connection. It will be understood that the communications provisioning process need not occur through a physical connection, and in some example embodiments the communications provisioning process will occur OTA. In at least one example embodiment, at least a portion of the communications provisioning process occurs through a Secure Shell (SSH) or similar connection. As will be appreciated by those skilled in the art, in SSH protocol both ends of the client/server connection are authenticated using a digital certificate, and passwords are protected by being encrypted.

In step 264 with the communications provisioning process not yet finished, the notification data 130 and the authentication data 73 are established. As will be appreciated by those skilled in the art, the notification data 130 and authentication data 73 can be established concurrently with the establishment of encryption keys, so if, for example, the communications provisioning process occurs via a cradle, the authentication data 73 could be downloaded concurrently to the client device with the keys while the client device is connected to a desktop computer on the enterprise network 108. Concurrent download of keys and authentication data 73 could of course also occur in some other secure fashion, such as through an SSH connection, for example.

For at least some of those example embodiments in which communications are carried out in accordance with a packet-based protocol, the notification data includes one or more ToS packets that are stored on the server system 109. As previously explained, the client devices 60 and 70 will take action in response to specific authenticated notification data 130 sent to them to over a non-secure channel.

As noted above, the authentication data 73 is related to the notification data 130 in such a manner that it may be used to authenticate the notification 130. In the simplest embodiment, the authentication data 73 is a unique packet or code that matches the notification data 130, meaning that authentication takes place by comparing the received notification data 130 with the authentication data 73 stored on the device to ensure they match. In some cases, the authentication data 73 may include plural codes or packets, each corresponding to a particular service, and the notification data 130 sent by the server system 109 may match one of the plural codes or packets so as to indicate termination of a specific service. In yet another embodiment, the authentication data 73 may comprise a decryption key for decrypting the notification data 130 to authenticate it. The notification data 130 may include a ToS packet signed or encrypted using the authentication key 73, in the case using symmetric encryption. In an asymmetric encryption example, the ToS packet may be encrypted using a public key of a key pair, and the authentication data 73 may comprise the private key of the key pair. Other examples and modifications will be understood by those skilled in the art.

In step 268, the communications provisioning process between the client device 60 (or 70) and the server system 109 is terminated. The client device 60 (or 70) is now typically in a condition to have one or more services provided to it by the server system 109 within the enterprise network 108.

In step 272, one or more services between the client device 60 (or 70) and the server system 109 are established. As the server system 109 provides one or more services to the client device 60 (or 70), encrypted data comprising communications will pass between the client device 60 (or 70) and the server system 109 along the secure channel 130 with successful encryption of outbound data and decryption of inbound data at both the client device 60 (or 70) and the server system 109.

At some point during provision of the service, a breakdown (i.e. termination) occurs with respect to the service. Some examples of breakdown/termination in one or more provided services are characterized by inability of the server system 109 to encrypt and/or decrypt data exchanged between the client device 60 (or 70) and the server system 109. Another example may include receipt of an instruction or message from an enterprise network administrator indicating that the service is to be terminated. Yet another example may include detection that the client device 60 (or 70) has had its server association transferred to another server system and/or enterprise network. Other examples will be appreciated by those skilled in the art.

Accordingly, in step 276, the enterprise network 108 is monitored to identify any service breakdown (i.e. termination of service). In some example embodiments, monitoring of the enterprise network 108 is carried out by a ToS detector and notifier 126 (FIG. 2). In at least some examples, the notifier 126 obtains or is provided with information that is processed to make a determination as to whether there has been a termination of one or more services within the server system 109. This could be done at certain intervals and/or in response to specific events within the enterprise network 108. Also, although the notifier 126 is illustrated in FIG. 2 as a subsystem distinct from other illustrated subsystems, it will be understood that the notifier 126 could be a component of some subsystem within the server system 109 (such as the wireless connector subsystem 124, for example).

Thus, the notifier 126 could obtain and/or could be provided with information for identifying whether there has been a termination of one or more services within the server system 109. As an example, if the wireless connector system 124 were to receive certain data that it could not decrypt, it could provide information (for example, some portion of the encrypted data) to the notifier 126 so that the notifier 126 could attempt to make a determination in step 280 as to whether there has been a termination of one or more services within the server system 109. For instance, the notifier 126 might have access to expired keys or information about expired keys (for example, when keys expired) and could use the expired keys or information about expired keys to identify a ToS because the notifier 126 is able to determine that a client device is sending data encrypted with an expired key, meaning new keys need to be generated and stored before the service can resume.

As another example, the notifier 126 might try to determine if the key needed to decrypt the received encrypted the data is known to another server system within a different enterprise network. The notifier 126 could, for example, transmit (over a secure channel, for example) a portion of the received encrypted data to one or more server systems on the same or different enterprise network(s) along with a request to determine if the other server system knows the key to decrypt the received encypted data. If the other server system provides an affirmative response, the notifier 126 could make a determination in the step 280 that the device is associated with the other server system and contains an out-dated service interface code causing it to assume a service will be provided by the server system 109. Accordingly, the client device 60 (or 70) may require a termination of service notice from the server system 109. It will be understood that the above described situation is not limited to those instances where the other server system is located on a different enterprise network than the network 108. For example, both the other server system and the server system 109 could be located within the same enterprise network, but the wireless connector subsystems 124 of the two server systems might not be in a single cluster where there is a shared key store. In such a scenario, data that can be decrypted by a wireless connector subsystem in one server system would not necessarily be also capable of being decrypted by a wireless connector subsystem in the other server system.

As yet another example of types of information for processing in the identification of a ToS, the notifier 126 might be sent information indicating that the user of the client device 60 (or 70) is no longer entitled to one or more services he was previously entitled to. The scenario in this example is not characterized by inability of the server system 109 to encrypt and/or decrypt data exchanged between the client device 60 (or 70) and the server system 109, but rather the scenario is characterized by the server system 109 deliberately causing a ToS. For example, an enterprise network administrator may instruct the server system to terminate a particular service to one or more client devices 60 (or 70).

If a ToS is identified in the step 280, the notifier 126 transmits the stored ToS indication data from the server system 109 to the client device 60 (or 70) in step 284. In at least some examples, the notification data 130 sent by the notifier 126 is transmitted over the non-secure channel 132 because transmission over any secure channels such as the channel 130 is not possible (or at least is impractical).

The notification data 130 sent by the notifier 126 will be received by the client device 60 (or 70) for processing. In some examples, after initial handling of the notification data 130 by the client device's communications subsystem 11 (FIG. 1) the device's operating system 50 will authenticate the received notification data 130 by comparing it against the authentication data 73 stored on the flash memory 24. In at least one example, the client device 60 (or 70) attempts to match the notification data 130 to the authentication data 73. As described above, the notification data 130 may comprise a ToS packet and the authentication data 73 may also comprise one or more ToS packets (each associated with a different service). The device operating system 50 may look for one or more packet identifiers within the received notification data 130 to determine which of the ToS packets of the authentication data 73 are accessed for carrying out verification. A particular ToS packet could be for indicating that an entire bundle of services has been terminated. In such examples, identifiers of wireless connector subsystems could be used as the packet identifiers associated with ToS packets. Other variations and modifications with respect to the authentication of the notification data 130 using the authentication data 73 will be understood by those skilled in the art.

If the received ToS indication data is authenticated, the client device 60 (or 70) will register that there has been a ToS, meaning that one or more services have been terminated. The registering of a ToS will impact future operation of the client device 60 (or 70). For example, the client device 60 (or 70) will cease sending the server system 109 any data associated with the terminated service(s). As another example, a service interface code stored on the client device 60 (or 70) could be modified or reset to take into account the ToS. Modification of the service interface code could occur in a number of ways as understood by those skilled in the art. For instance, instructions stored on the device 60 (or 70) could be executed with such instructions modifying the service interface code. As an alternative possibility, modification information (originating from the enterprise network 108 or some other location) could accompany the notification data 130 received by the device, and the device's operating system could employ this information to appropriately modify the service interface code.

In some examples where the client device 60 (or 70) registers a ToS, a communications re-provisioning process will automatically be initiated in order to attempt re-establishment of the service. In other examples where the client device 60 (or 70) registers a ToS, the communications provisioning process will not occur again automatically. For instance, the user of the client device 60 (or 70) might instead be provided with a message on the display screen 22 (FIG. 1) informing him/her that he/she needs to take certain steps, such as connecting the device to a desktop computer system (for example, through a cradle) in order to have an update perform and until then one or more services have been terminated. In at least some examples of the communications re-provisioning process, the process includes the steps of generating new keys for encrypting and decrypting data sent between the client device 60 (or 70) and the wireless connector subsystem 124 in connection with the service(s), and also generating new notification data 130 and authentication data 73 that differs from the previous such data.

As previously mentioned, in at least some example embodiments other types of communications besides e-mail, SMS messages, etc. can be contained in the data transmitted between the server system 109 and the client device 60 (or 70). The server system 109 may optionally include one or more other servers 122 enabling the server system 109 to provide other types of services to the client device 60 (or 70) besides those related to e-mail, SMS messages, etc. In some examples, the server 109 could be a collaboration server employed in conjunction with one or more collaboration tools in relation to cooperative document revision, team rooms, discussions stored in discussion databases and the like. In other examples, the server 109 could be a type of media server enabling the server system 109 to provide services similar to those associated with so-called unified messaging systems. Just as the wireless connector subsystem 124 can send messages (which it obtains through decryption of data sent over the secure channel 130) to the messaging server 120 for subsequent handling, so too could the wireless connector subsystem 124 be configured to send other types of communications (for example, audio objects or documents which it would also obtain through decryption of data sent over a secure channel) to the server 109 for subsequent handling. Also, the messaging server 120 may, in some examples, include additional functionality for handling alternative types of communications.

Certain adaptations and modifications of the described embodiments can be made. Therefore, the above discussed embodiments are considered to be illustrative and not restrictive.

What is claimed is:

1. A method for notifying a wireless client device of termination of at least one service provided to the client device by a server system through a wireless network, the server system being disposed within an enterprise network having access to the wireless network, the server system having stored thereon notification data and the wireless client device having stored thereon authentication data, wherein the authentication data is related to the notification data, wherein said notification data includes a termination of service packet, and wherein said authentication data includes one or more termination of service packets to be compared to said notification data, and wherein the server system stores an encryption key associated with the wireless client device for encrypted communications for said at least one service, the method comprising:

determining, at the server system, that the encryption key is expired and that no other unexpired encryption keys are presently available in association with the wireless client device;

ceasing to provide the at least one service to the wireless client device;

and in response to determining that the encryption key is expired, transmitting said notification data to the wireless client device to notify the wireless client device that the at least one service has been terminated, wherein said client device may authenticate said notification data received from the server system on the basis of the stored authentication data and the relationship between the notification data and the authentication data.

2. The method as claimed in claim 1 wherein said notification data is transmitted over a non-encrypted channel.

3. The method as claimed in claim 1 wherein said notification data includes a termination of service packet, and wherein said authentication data includes one or more termination of service packets to be compared to said notification data.

4. The method as claimed in claim 1, wherein said notification data includes an encoded termination of service packet that may be decoded using said authentication data.

5. The method as claimed in claim 1, wherein said notification data is specific to both said at least one service and said client device.

6. The method as claimed in claim 1, wherein the at least one service includes an email forwarding service, and wherein the client device is associated with the server system.

7. The method as claimed in claim 1, further including authenticating said notification data at the client device by deriving authentication data from said notification data and comparing said derived authentication data with said stored authentication data.

8. The method as claimed in claim 1, wherein determining includes receiving an encrypted packet from the wireless client device and determining that the encrypted packet has been encrypted with an expired key.

9. A non-transitory computer readable storage medium having encoded thereon computer executable instructions for configuring a processor to perform the method claimed in claim 1.

* * * * *